(12) United States Patent
King et al.

(10) Patent No.: US 7,098,400 B1
(45) Date of Patent: Aug. 29, 2006

(54) METER MOUNTING BRACKET

(76) Inventors: Mack B. King, Rt. 1, Box 219A, Mannington, WV (US) 26582; Frances S. King, Rt. 1, Box 219A, Mannington, WV (US) 26582

( * ) Notice: Subject to any disclaimer, the term of this patent is extended or adjusted under 35 U.S.C. 154(b) by 0 days.

(21) Appl. No.: 11/254,330

(22) Filed: Oct. 20, 2005

(51) Int. Cl.
  *H01H 9/02* (2006.01)
(52) U.S. Cl. ............................ 174/58; 174/38; 174/39; 361/664
(58) Field of Classification Search ................ 174/58, 174/38, 17 R, 39; 361/664, 665; 52/3; 220/3.3
  See application file for complete search history.

(56) References Cited

U.S. PATENT DOCUMENTS

| | | |
|---|---|---|
| 4,723,746 A | 2/1988 | Gould et al. |
| 5,004,199 A | 4/1991 | Suk |
| 5,263,676 A | 11/1993 | Medlin, Jr. et al. |
| 6,958,447 B1 * | 10/2005 | Thornton et al. ............. 174/58 |

* cited by examiner

*Primary Examiner*—Dhiru R. Patel
(74) *Attorney, Agent, or Firm*—Raymond M. Galasso; Galasso & Associates, LP

(57) ABSTRACT

A durable, pre-formed, and standardized mounting bracket is provided for mounting electrical meter boxes and other switching devices to a service pole or to a flat surface. An embodiment is configured to fit around a service pole and to be attached to the pole by screws or bolts through lag bolt holes in the sides of the bracket. Another embodiment fits against a flat surface such as a wall and is attached there by screws or bolts through lag bolt holes in a flat plate. Both types have meter mounting socket holes for mounting to the holes in the back of meter boxes with bolts, washers, and nuts. Different sizes of mounting brackets are provided for meters of different sizes. The bracket is manufactured of durable material such as metal for outdoor use.

7 Claims, 3 Drawing Sheets

METER MOUNTING BRACKET

FIELD OF THE DISCLOSURE

The present invention relates to the art of support brackets and more particularly to a bracket for mounting electrical meter boxes and switching devices such as disconnect switches.

BACKGROUND

Electrical meter boxes, or meter sockets, with meters that monitor the monthly amount of electricity used by structures are widely used. Typically, they are attached to the permanent walls of the structures or to other permanent surfaces, such as service poles, outside the structures. Often they are first attached to wooden boards found at random at sites and then attached to permanent structures, but this can make for an unprofessional-looking installation. Moreover, the installers of electrical meter boxes often have to devise different methods of mounting them at different sites with varying configurations, which can be time consuming and expensive. For example, installers may have to cut, fit, or shape boards to create mounting brackets and drill mounting holes in the boards. In addition, wooden boards used as mounting brackets may decay or rot over the years and have to be replaced. Similar problems apply to electrical switching devices in general, for example disconnect switches.

Therefore, there is a need for a durable, pre-formed, and standardized mounting bracket for electrical meter boxes and other switching devices.

SUMMARY OF THE DISCLOSURE

The following explanation describes the present invention by way of example and not by way of limitation.

It is an aspect of the present invention to provide a pre-formed mounting bracket for electrical meter boxes and other switching devices.

It is another aspect of the present invention to provide a pre-formed mounting bracket for electrical meter boxes and other switching devices that is manufactured out of metal.

It is still another aspect of the present invention to provide a pre-formed mounting bracket for electrical meter boxes and other switching devices that has pre-drilled mounting holes.

These and other aspects of the present invention will become readily apparent upon further review of the following specification and associated drawings. In accordance with the present invention, a durable, pre-formed, and standardized mounting bracket is provided for mounting electrical meter boxes and other switching devices to a service pole or to a flat surface. An embodiment is configured to fit around a service pole and to be attached to the pole by screws or bolts through lag bolt holes in the sides of the bracket. Another embodiment fits against a flat surface such as a wall and is attached there by screws or bolts through lag bolt holes in a flat plate. Both types have meter mounting socket holes for mounting to the holes in the back of meter boxes with bolts, washers, and nuts. Different sizes of mounting brackets are provided for meters of different sizes. The bracket is manufactured of durable material such as metal for outdoor use.

BRIEF DESCRIPTION OF THE DRAWINGS

The following embodiments of the present invention are described by way of example only, with reference to the accompanying drawings, in which.

DETAILED DESCRIPTION OF THE DRAWING FIGURES

The following description of drawings is offered to illustrate the present invention clearly. However, it will be apparent to those skilled in the art that the concepts of the present invention are not limited to these specific details. Also, commonly known elements are shown in diagrams for clarity, as examples only and not as limitations of the present invention.

The present invention provides a durable, pre-formed, and standardized mounting bracket for electrical meter boxes and other switching devices such as disconnect switches. In an embodiment, it comprises a bracket for mounting a meter box on a pole. In another embodiment, it comprises a bracket for mounting a meter box on a flat surface, for example the wall of a structure.

Figure 1:
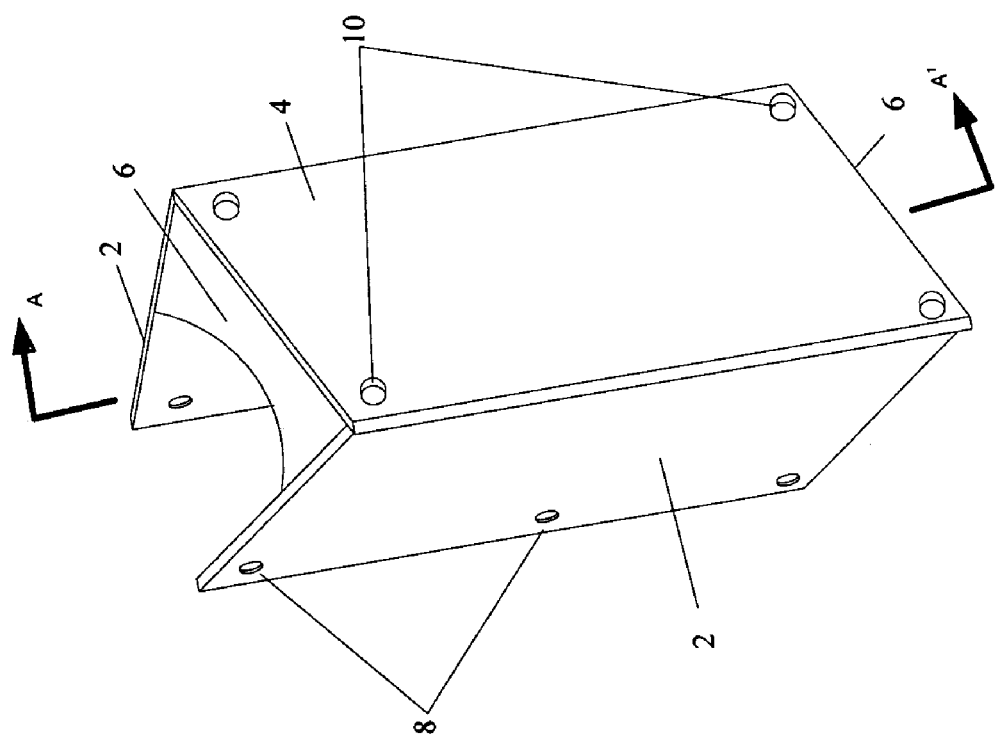
FIG. 1 is perspective diagram that illustrates a side view of a bracket for mounting a meter box on a service pole.

FIG. 1 shows an embodiment for mounting a meter box on a service pole, which comprises the following elements:

Two side plates 2,

A front plate 4,

Two plates with curved sides 6, one on the top of the bracket and one on the bottom, Lag bolt holes 8, and Meter socket mounting holes 10.

Figure 2:
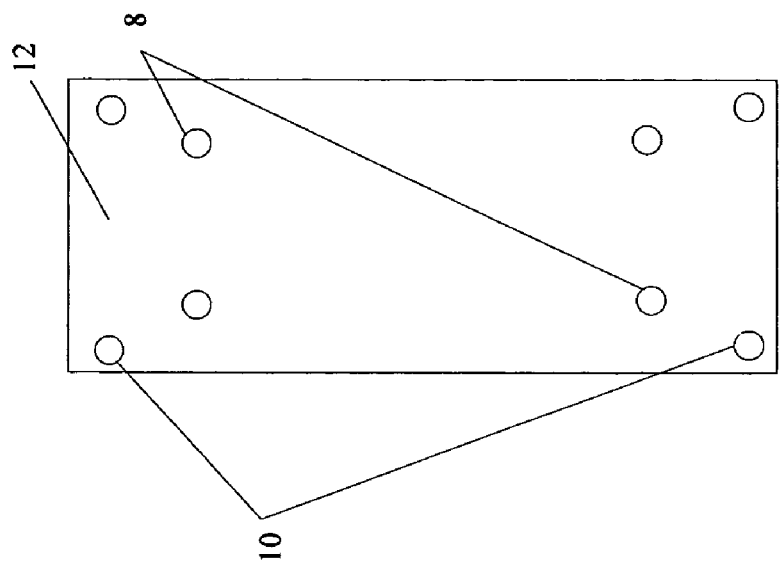
FIG. 2 is diagram that illustrates a front view of a bracket for mounting a meter box on a flat surface.

FIG. 2 shows an embodiment for mounting a meter box on a flat surface, which comprises the following elements:

A flat plate 12,

Lag bolt holes 8, and

Meter socket mounting holes 10.

Figure 3:
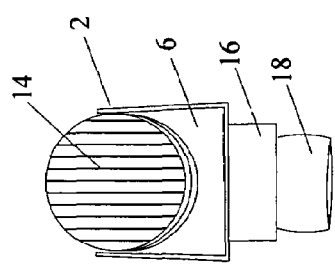
FIG. 3 is diagram that illustrates a top view of a meter mounting bracket attached to a service pole.

For the embodiment for mounting a meter box on a service pole, as shown in the top view presented in FIG. 3, the side plates 2 and plates with curved sides 6 are configured to allow the side plates 2 to be placed around a pole 14. The plates with curved sides 6 fit securely against the pole 14. The meter box 16 and meter 18 can thus be placed against the pole 14 for attachment by means of the bracket.

Figure 4:
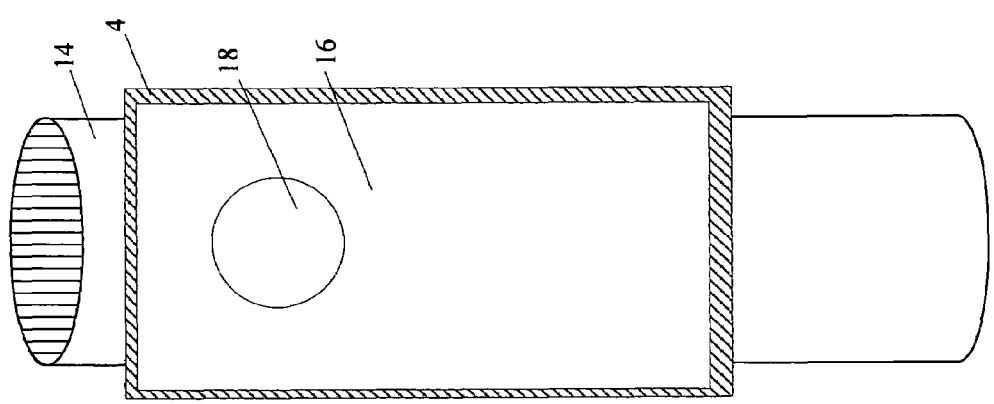
FIG. 4 is diagram that illustrates a front view of a meter mounting bracket attached to a service pole.

FIG. 4 shows a front view of a meter box 16 and meter 18 mounted on a pole 14 by means of the bracket. The holes in the back of meter box 16 are mounted in alignment with the meter socket mounting holes 10, shown in FIG. 1, in the front plate 4 of the bracket, so that bolts, washers, and nuts can be used to attach the meter box 16, shown in FIG. 4, to the front plate 4.

Figure 5:
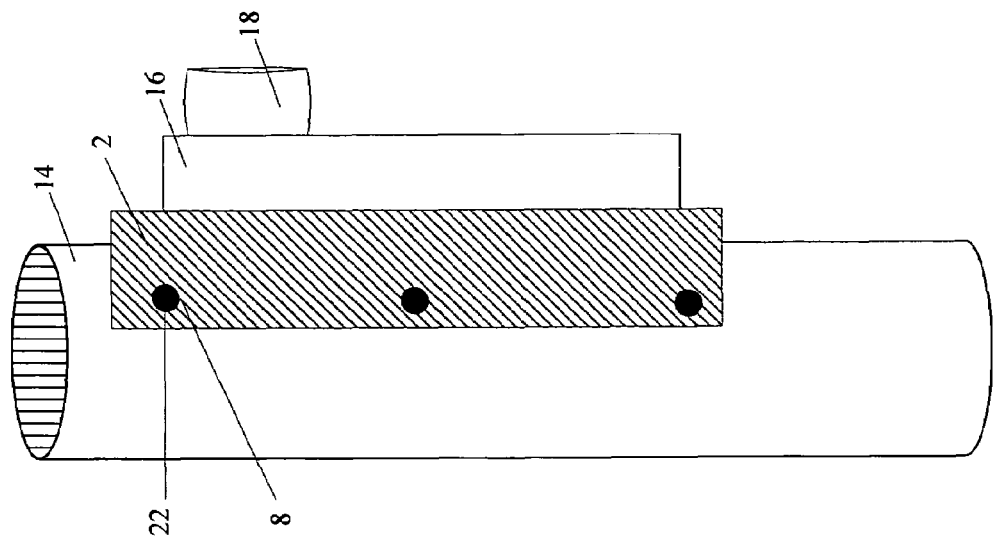
FIG. 5 is diagram that illustrates a side view of a meter mounting bracket attached to a service pole.

As shown in the side view presented in FIG. 5, lag bolts 22 are screwed through the lag bolt holes 8 in the side plates 2 to attach the bracket to the pole 14. In different embodiments, different numbers of lag bolt holes 8 may be used, for example four or six.

Figure 6:
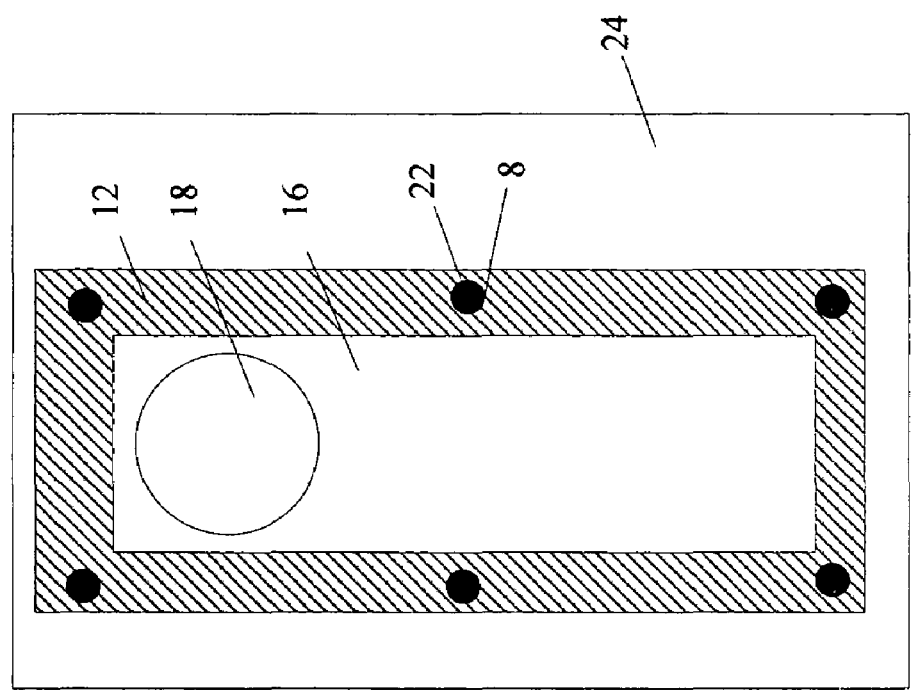
FIG. 6 is diagram that illustrates a front view of a meter mounting bracket mounted on a flat surface.

For the embodiment for mounting a meter box 16 on a flat surface 24, as shown in FIG. 6, the flat plate 12 is configured to fit securely against a flat surface 24, for example against a wall. Lag bolts 22 can be screwed through the lag bolt holes 8 to attach the flat plate 12 to the flat surface 24. The holes in the back of the meter box 16 are aligned with the meter socket mounting holes 10, shown in FIG. 2, of the flat plate 12, so that bolts, washers, and nuts can be used to attach the meter box 16, shown in FIG. 6, to the flat plate 12.

Figure 7:
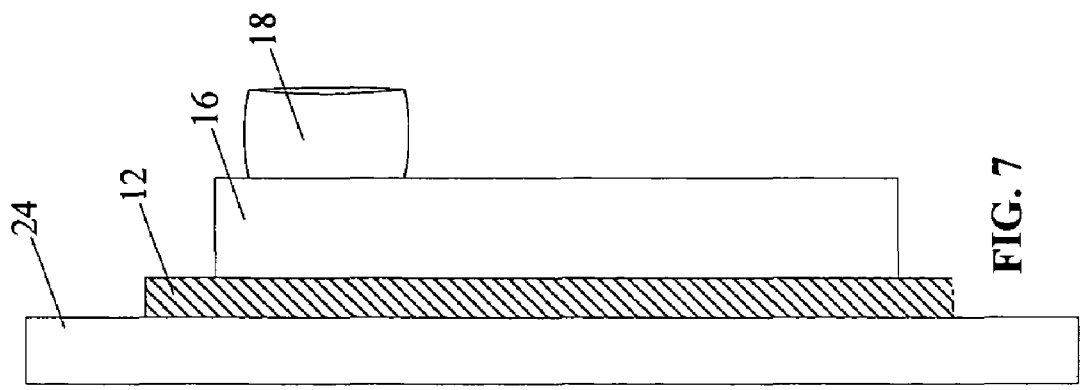
FIG. 7 is diagram that illustrates a side view of a meter mounting bracket mounted on a flat surface.

FIG. 7 shows a side view of the meter box 16 and meter 18 attached to the flat plate 12, and the flat plate 12 attached to a flat surface 24 such as a wall.

The best dimensional relationships for the parts of the invention described above, including variations in form and use, will be readily apparent to those skilled in the art, and are intended to be encompassed by the present invention.

Different embodiments of the present invention may be configured to fit different sizes of meters and disconnect switches. For a 100 amp. meter, for example, the pole-mounted bracket may measure 24 inches in height, 12 inches in width, and 6 inches in depth. Another useful embodiment measures 30 inches in height, 12 inches in width, and 6 inches in depth. A third embodiment measures 36 inches in height, 12 inches in width, and 6 inches in depth The bracket may be manufactured of galvanized steel, aluminum, fiberglass, plastic, or other lightweight and durable materials.

Use

An installer of a meter box obtains a bracket of the appropriate size for the particular meter to be installed. For mounting on a service pole, the installer places the sides 2, shown in FIG. 3, of the bracket around the pole 14. The installer screws lag bolts, shown in FIG. 5, through the lag bolt holes 8 in the sides 2 of the bracket and into the pole 14 to mount the bracket. The installer then aligns the holes in the back of the meter box with the meter socket mounting holes in the bracket and attaches the meter box to the bracket with bolts, washers, and nuts.

For mounting on a flat surface, the installer places the flat plate 12, shown in FIG. 6, of the bracket against a flat surface 24 such as a wall. The installer screws lag bolts 22 through the lag bolt holes 8 and into the surface 24 to mount the flat plate 12. The installer then aligns the holes in the meter box with the meter socket mounting holes in the bracket and attaches the meter box to the bracket with bolts, washers, and nuts.

The bracket would save time and money because of the pre-drilled holes for mounting and because installers would not need to cut, fit, or shape the bracket for the meter box or the structure on which the meter box is mounted. Because the bracket is manufactured of a durable material such as metal, it would not decay or rot.

What is claimed is:

1. A pre-configured bracket for mounting electrical meter boxes and other switching devices to a pole, the bracket comprising
    two flat sides such that a flat side can be placed on either side of a pole, the flat sides comprising lag bolt holes,
    two plates with curved sides, one at the top of the bracket and one at the bottom, such that the curved sides form a concave area into which the convex surface of a pole may fit, and
    a front plate comprising meter socket mounting holes, such that the meter socket mounting holes can be aligned with the holes in the back of a meter box.

2. The bracket of claim 1, wherein the bracket measures 24 inches in height, 12 inches in width, and 6 inches in depth.

3. The bracket of claim 1, wherein the bracket measures 30 inches in height, 12 inches in width, and 6 inches in depth.

4. The bracket of claim 1, wherein the bracket measures 36 inches in height, 12 inches in width, and 6 inches in depth.

5. The bracket of claim 1, wherein the bracket is manufactured of metal.

6. The bracket of claim 1, wherein the bracket is manufactured of plastic.

7. A pre-configured bracket for mounting electrical meter boxes and other switching devices to a pole, wherein the bracket
    measures 24 inches in height, 12 inches in width, and 6 inches in depth, comprises
        two flat sides such that a flat side can be placed on either side of a pole, the flat sides comprising lag bolt holes,
        two plates with curved sides, one at the top of the bracket and one at the bottom, such that the curved sides form a concave area into which the convex surface of a pole may fit, and
        a front plate comprising meter socket mounting holes, such that the meter socket mounting holes can be aligned with the holes in the back of a meter box, and
    is manufactured of metal.

* * * * *